(12) United States Patent  (10) Patent No.: US 8,251,850 B2
Phillips  (45) Date of Patent: Aug. 28, 2012

(54) STRONG TWO-MODE HYBRID POWERTRAIN WITH TWO MOTOR/GENERATORS

(75) Inventor: Andrew W. Phillips, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 347 days.

(21) Appl. No.: 12/627,025

(22) Filed: Nov. 30, 2009

(65) Prior Publication Data

US 2011/0130235 A1  Jun. 2, 2011

(51) Int. Cl.
*F16H 37/06* (2006.01)

(52) U.S. Cl. .......................................................... 475/5

(58) Field of Classification Search ............... 475/5, 286
See application file for complete search history.

(56) References Cited

U.S. PATENT DOCUMENTS

| | | | |
|---|---|---|---|
| 5,558,595 A | 9/1996 | Schmidt et al. | |
| 5,931,757 A | 8/1999 | Schmidt | |
| 6,478,705 B1 | 11/2002 | Holmes et al. | |
| 6,527,658 B2 | 3/2003 | Holmes et al. | |
| 6,962,545 B2 | 11/2005 | Larkin | |
| 7,172,525 B2 * | 2/2007 | Sowul et al. | 475/5 |
| 7,252,612 B2 * | 8/2007 | Bucknor et al. | 475/5 |
| 7,300,374 B2 * | 11/2007 | Bucknor et al. | 475/5 |

* cited by examiner

*Primary Examiner* — David D Le
*Assistant Examiner* — David J Hlavka
(74) *Attorney, Agent, or Firm* — Quinn Law Group, PLLC

(57) ABSTRACT

A hybrid electro-mechanical transmission connectable with multiple power sources for launching and propelling a vehicle includes an output member and a stationary member. The transmission also includes a first and second planetary gear sets, and two members of the first planetary gear set are operatively connected to two members of the second planetary gear set, and a torque-transmitting device. The power sources include an engine, a first motor/generator and a second motor/generator. The engine and the second motor/generator are each operatively connected to the first planetary gear set, and the first motor/generator and the output member are each operatively connected to the second planetary gear set. Furthermore, the torque-transmitting device is engageable to ground the engine to the stationary member such that the transmission provides first and second drive modes for launching and propelling the vehicle.

15 Claims, 1 Drawing Sheet

STRONG TWO-MODE HYBRID POWERTRAIN WITH TWO MOTOR/GENERATORS

TECHNICAL FIELD

The invention relates to a hybrid electro-mechanical powertrain having two motor/generators.

BACKGROUND OF THE INVENTION

To produce a more efficient vehicle, common hybrid vehicle powertrains combine an electric motor and a conventional engine. Torque from the engine and the electric motor is typically channeled to the vehicle's driven wheels via a transmission. Efficiency of a hybrid vehicle powertrain is typically related to the percentage of time and during what type of driving conditions the engine must be run in addition to or in place of the electric motor to power the vehicle.

Some hybrid powertrains employ a single electric motor in combination with the engine. In such powertrains, transmission output, and hence vehicle speed, is directly related to the speeds and torques of the engine and the electric motor. Other hybrid powertrains employ two electric motors in combination with the engine to power the vehicle.

A hybrid powertrain utilizing an engine and two electric motors may connect the engine and the electric motors to a transmission such that torque and speed of the engine may be selected independently of vehicle speed and desired acceleration. Such control of the engine is typically achieved by varying individual torque contribution from the two electric motors. Thus, a hybrid powertrain utilizing an engine in combination with two electric motors may provide suitable torque contribution from each of the engine and the two motors and afford improved overall vehicle efficiency.

SUMMARY OF THE INVENTION

A hybrid electro-mechanical transmission connectable with multiple power sources for launching and propelling a vehicle is provided, and includes an output member and a stationary member. The transmission also includes a first planetary gear set and a second planetary gear set. Each of the first and the second planetary gear sets include a first, a second, and a third member, and two members of the first planetary gear set are operatively connected to two members of the second planetary gear set. The transmission additionally includes a torque-transmitting device. The power sources include a first motor/generator, a second motor/generator and an engine. The engine and the second motor/generator are each operatively connected with the first planetary gear set, and the first motor/generator and the output member are each operatively connected with the second planetary gear set. Additionally, the torque-transmitting device is engageable to ground the engine to the stationary member, such that the transmission provides first and second drive modes for launching and propelling the vehicle.

The engine may be operatively connected to the third member of the first planetary gear set, the first motor/generator may be operatively connected to the second member of the second planetary gear set, and the second motor/generator may be operatively connected to the second member of the first planetary gear set. The first member of the first planetary gear set may be operatively connected to the third member of the second planetary gear set, and the third member of the first planetary gear set may be operatively connected to the first member of the second planetary gear set. The output member may then be operatively connected to the third member of the second planetary gear set.

As disclosed, engaging the torque-transmitting device grounds the engine to the stationary member to provide the first drive mode with the engine stopped, and disengaging the torque-transmitting device provides the second drive mode with the engine running. Thus configured, the transmission is capable of providing two drive modes, each capable of launching and propelling the vehicle in either a forward or a reverse direction.

The torque-transmitting device may have the capability to transmit torque in two directions and be configured as either a selectively engageable clutch or a brake. The respective operative connections of the engine and of the motor/generators with the first and the second planetary gear sets in the transmission may facilitate a controlled selection of speeds and torques of the engine and of the motor/generators for launching and propelling the vehicle. A hybrid electric vehicle employing the foregoing configuration is also provided.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
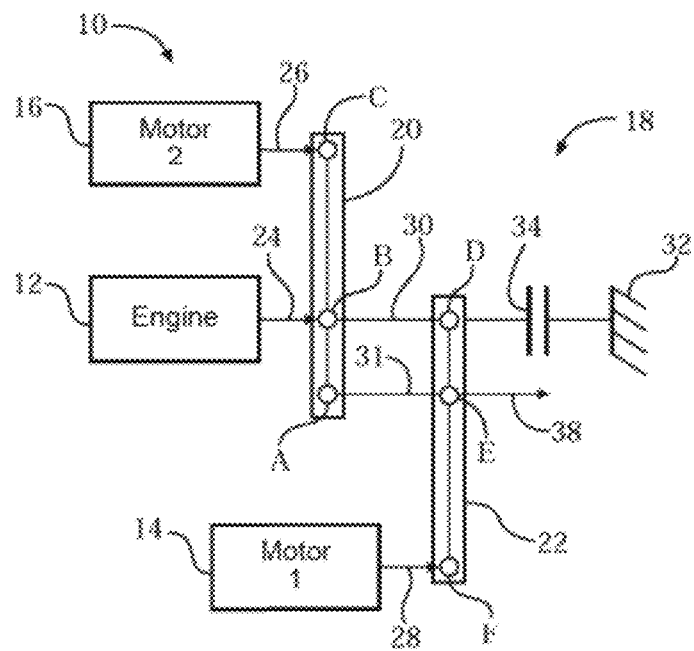
FIG. 1 is a schematic lever diagram illustration of an electrically variable transmission employed in a hybrid powertrain.

Referring to the drawings, wherein like reference numbers refer to like components, FIG. 1 illustrates a hybrid powertrain 10. The hybrid powertrain 10 includes multiple power sources, which include an internal combustion engine 12, a first electric motor/generator 14, and a second electric motor/generator 16, all connected to an "electrically variable transmission" (EVT) designated generally by the numeral 18. As is known by those skilled in the art, an "electrically variable transmission" constitutes a transmission planetary gear train operatively connected with each of the engine 12, the first motor/generator 14 and the second motor/generator 16. Channeling respective torques of the engine 12 and the two motor/generators 14 and 16 to different members of the planetary gear train permits one of the power sources to either assist or balance the operation of any of the other two. Thus, the combination of one engine 12 and two motor/generators 14 and 16 operatively connected to the EVT 18 allows speeds and torques of the engine and motor/generators to be controlled and selected independently in order to power a subject vehicle more efficiently. Furthermore, the connections of the hybrid powertrain 10, to be described in greater detail below, may permit an overall decrease in torque requirement from the combination of the first and the second motor/generators 14 and 16 while affording acceptable vehicle performance, as compared with other systems.

The EVT 18 includes two planetary gear sets represented in lever diagram form in FIG. 1. A lever diagram is a schematic representation of the components of a mechanical device such as an automatic transmission. Each individual lever represents a planetary gear set or an external gear set. In the planetary gear set levers, the three basic mechanical components of the planetary gear are each represented by a node. Therefore, a single planetary gear set lever contains three nodes: one for the sun gear member, one for the planet gear carrier member, and one for the ring gear member. The relative length between the nodes of each planetary gear set lever can be used to represent the ring-to-sun ratio of each respective gear set. These lever ratios, in turn, are used to vary the gear ratios of the transmission in order to achieve appropriate ratios and ratio progression. Mechanical couplings or interconnections between the nodes of the various planetary gear sets are illustrated by thin, horizontal lines and torque transmitting devices such as clutches and brakes are presented as interleaved fingers. If the device is a brake, one set of the fingers is grounded. Further explanation of the format, purpose and use of lever diagrams can be found in SAE Paper 810102, authored by Benford, Howard and Leising, Maurice, "The Lever Analogy: A New Tool in Transmission Analysis", 1981, which is hereby fully incorporated by reference.

A lever or first planetary gear set 20 includes a first, second, and third nodes, A, B and C, respectively. The nodes A, B, and C represent a first, second and third members of the first planetary gear set 20, preferably a ring gear member, a carrier member and a sun gear member, although not necessarily in that order. The EVT 18 also includes a second planetary gear set 22, which includes a fourth, fifth and sixth nodes, D, E and F, respectively. Analogous to gear set 20, the nodes D, E, and F represent a first, second and third members of the second planetary gear set 22, preferably a ring gear member, a carrier member and a sun gear member, although, again, not necessarily in that order.

Engine 12, first electric motor/generator 14, and second electric motor/generator 16 are operatively connected to the EVT 18 via an input member arrangement. The input member arrangement from the power sources provides torque to the EVT 18. The input member arrangement includes an output shaft of the engine 12 which serves as an input member 24, a rotor of the second motor/generator 16 that serves as an input member 26, and a rotor of the first motor/generator 14 that serves as an input member 28. The input member 24 is configured to provide engine torque to the EVT 18. The input member 26 and input member 28 are each configured to provide torque from the second motor/generator 16 and from the first motor/generator 14, respectively, to the EVT 18. The second node B is continuously connected to the input member 24, the third node C is continuously connected to the input member 26, and the sixth node F is continuously connected to the input member 28. The fifth node E is continuously connected with the output member 38, which provides output torque for launching and propelling the vehicle.

A first interconnecting member 30 continuously interconnects the second node B with the fourth node D. A second interconnecting member 31 continuously interconnects the first node A with the fifth node E. Thus, two nodes of the first planetary gear set are operatively and continuously connected to two nodes of the second planetary gear set. The fourth node D is selectively connectable with a stationary member or housing 32 of the EVT 18 via a torque-transmitting device 34, to thereby ground the fourth node. Torque-transmitting device 34 may be configured as selectively or automatically engageable, and be configured to transmit torque in two directions, as understood by those skilled in the art. Well known examples of torque-transmitting devices capable of transmitting torque in two directions are friction plate-type clutches, brakes, and dog clutches. An electrically actuated dog clutch may be employed in one embodiment, as a simple, effective mechanism to ground the fourth node D.

Although not shown, equally within the scope of the appended claims is a configuration where the engine 12 is continuously connected with node A. In such a configuration, the output member 38 is continuously connected to node D, and the torque-transmitting device 34 is employed to selectively connect node E with the stationary member or housing 32. Such a powertrain may be subject to a different control strategy than powertrain 10 shown in FIG. 1, but will otherwise provide similar capabilities.

As understood by those skilled in the art, the powertrain 10 additionally has an electric power source (not shown), such as one or more batteries. The power source is operatively connected to the motor/generators 14 and 16 such that the motor/generators may transfer power to or receive power from the engine 12. Although not shown, the powertrain 10 also includes a controller or an electronic control unit (ECU). The controller is operatively connected to the electric power source to control the distribution of power from or to the power source.

In powertrain 10, the two electrically variable drive modes may be provided via electric-only input from both the first motor/generator 14 and the second motor/generator 16, or via combined input from both motor/generators and the engine 12. A first electrically variable drive mode of powertrain 10 is established by engaging the torque-transmitting device 34, and providing input torque from any combination of first motor/generator 14 and the second motor/generator 16. A second electrically variable drive mode of powertrain 10 is established by engaging the torque-transmitting device 34, and providing input torque from any combination of first motor/generator 14, second motor/generator 16, and engine 12. As configured, the powertrain 10 is equally adept at launching and propelling the vehicle in a forward, as well as a reverse direction.

Figure 2:
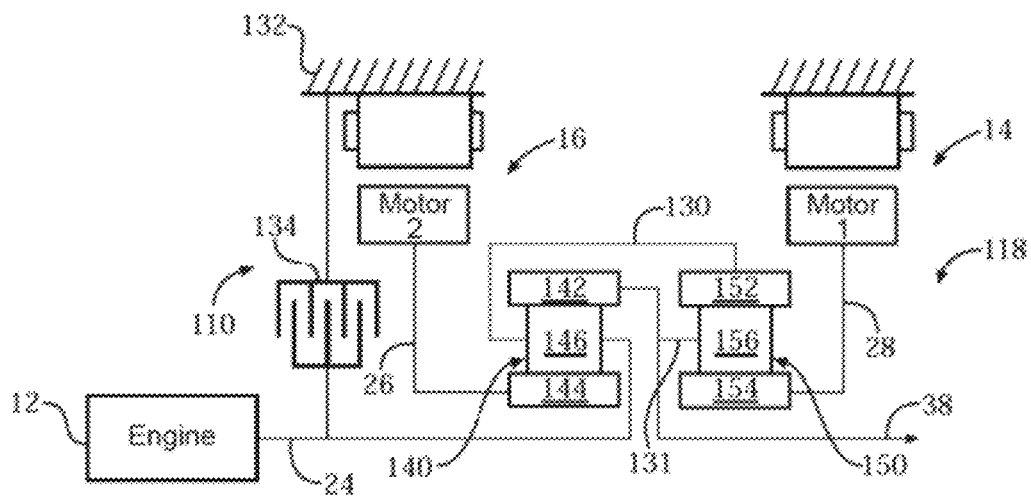
FIG. 2 is a schematic stick diagram illustration of the powertrain corresponding with the lever diagram of FIG. 1.

FIG. 2 depicts a powertrain 110 having an EVT 118. The powertrain 110 is a specific embodiment of a powertrain 10 shown in FIG. 1. The EVT 118 is represented by a schematic stick diagram that depicts specific planetary gear set connections corresponding to, and reflected by the lever diagram of FIG. 1. Although a specific powertrain 110 is represented, it will be understood that the particular embodiment is simply exemplary in nature, and other powertrain arrangements within the scope of the lever diagram of FIG. 1 are also contemplated.

The EVT 118 utilizes two differential gear sets, preferably in the nature of a first planetary gear set 140 and a second planetary gear set 150. First planetary gear set 140 employs a ring gear member 142, which circumscribes a sun gear member 144. A carrier member 146 rotatably supports a plurality of pinion gears that meshingly engage both the ring gear member 142 and the sun gear member 144. The second motor/generator 16 is continuously connected to the sun gear member 144. The engine 12 is continuously connected to the carrier member 146.

The second planetary gear set 150 employs a ring gear member 152, which circumscribes a sun gear member 154. A carrier member 156 rotatably supports a plurality of pinion gears that meshingly engage both the ring gear member 152 and the sun gear member 154. The first motor/generator 14 is continuously connected to the sun gear member 154. The output member 38 is continuously connected with the carrier member 156. An interconnecting member 130 continuously connects the carrier member 146 with the ring gear member 152. An interconnecting member 131 continuously connects the ring gear member 142 with the carrier member 156. The second motor/generator 16 is continuously connected with the sun gear member 144. The interconnecting members 130 and 131 may each be a single component or multiple linked components. Thus, two members of the planetary gear set 140 are continuously connected with two members of the planetary gear set 150 via the interconnecting members 130 and 131. Accordingly, the connection and interaction between planetary gear sets 140 and 150 is reflected by the lever diagram depicted in FIG. 1.

The ring gear member 142 corresponds with the first node A of FIG. 1. The carrier member 146 corresponds with the second node B of FIG. 1. The sun gear member 144 corresponds with the third node C of FIG. 1. The ring gear member 152 corresponds with the fourth node D of FIG. 1, and is continuously connected with the carrier member 146, a.k.a. second node B. The carrier member 156 corresponds with the fifth node E of FIG. 1, and is continuously connected with the ring gear member 142, a.k.a. first node A. The sun gear member 154 corresponds with the sixth node F of FIG. 1.

As will be readily understood by those skilled in the art, the EVT 18 is appropriate for a front-wheel-drive vehicle architecture, as the output member 38 is in a location well suited for a transverse arrangement common to front-wheel-drive vehicle applications. A torque-transmitting device 134 is selectively engageable to ground the ring gear member 152 with a stationary member 132, e.g., the transmission housing. The torque-transmitting device 134 is operable in like manner as corresponding torque-transmitting device 34 of FIG. 1. Similar to powertrain 10 of FIG. 1, the first electrically variable drive mode is established with torque-transmitting device 134 engaged and engine 12 stopped. Also similar to powertrain 10, the second electrically variable drive mode is established with the torque-transmitting device 134 disengaged and the engine 12 running. The first and second drive modes may each be employed to launch and propel the vehicle in either a forward or a reverse direction.

While the best modes for carrying out the invention have been described in detail, those familiar with the art to which this invention relates will recognize various alternative designs and embodiments for practicing the invention within the scope of the appended claims.

The invention claimed is:

1. A hybrid electro-mechanical transmission connectable with multiple power sources for launching and propelling a vehicle, comprising:
   an output member;
   a stationary member;
   a first planetary gear set and a second planetary gear set, wherein each of the respective first and second planetary gear sets includes a first, a second, and a third member, and wherein two members of the first planetary gear set are continuously connected to two members of the second planetary gear set; and
   a torque-transmitting device;
the power sources including:
   a first motor/generator;
   a second motor/generator; and
   an engine;
wherein:
   the engine and the second motor/generator are each continuously connected to the first planetary gear set, and the first motor/generator and the output member are each continuously connected to the second planetary gear set, and the torque-transmitting device is engageable to ground the engine to the stationary member such that the transmission provides a first drive mode and a second drive mode for launching and propelling the vehicle.

2. The transmission of claim 1, wherein:
   the engine is operatively connected to the third member of the first planetary gear set;
   the first motor/generator is operatively connected to the second member of the second planetary gear set;
   the second motor/generator is operatively connected to the second member of the first planetary gear set;
   the first member of the first planetary gear set is operatively connected to the third member of the second planetary gear set;
   the third member of the first planetary gear set is operatively connected to the first member of the second planetary gear set; and
   the output member is operatively connected to the third member of the second planetary gear set.

3. The transmission of claim 1, wherein engaging the torque-transmitting device grounds the engine to the stationary member to provide the first drive mode with the engine stopped, and disengaging the torque-transmitting device provides the second drive mode with the engine running.

4. The transmission of claim 1, wherein the torque-transmitting device is one of a selectively engageable clutch and a selectively engageable brake capable of transmitting torque in two directions.

5. The transmission of claim 1, wherein the respective operative connections of the power sources and of the motor/generators with the first and the second planetary gear sets facilitate a controlled selection of speeds and torques of the engine and of the motor/generators for launching and propelling the vehicle.

6. A hybrid powertrain for launching and propelling a vehicle, comprising:
   an engine;
   a first motor/generator and a second motor/generator;
   an electrically-variable transmission having:
      an output member;
      a stationary member;
      a first planetary gear set and a second planetary gear set, wherein each of the respective first and second planetary gear sets have a first, a second, and a third member, and two members of the first planetary gear set are continuously connected to two members of the second planetary gear set; and
      a torque-transmitting device;
   wherein:
      the engine and the second motor/generator are each continuously connected to the first planetary gear set, the first motor/generator and the output member are each continuously connected to the second planetary gear set, and the torque-transmitting device is engageable to ground the engine to the stationary member such that the transmission provides a first drive mode and a second drive mode for launching and propelling the vehicle.

7. The powertrain of claim 6, wherein:
   the engine is operatively connected to the third member of the first planetary gear set;
   the first motor/generator is operatively connected to the second member of the second planetary gear set;
   the second motor/generator is operatively connected to the second member of the first planetary gear set;
   the first member of the first planetary gear set is operatively connected to the third member of the second planetary gear set;
   the third member of the first planetary gear set is operatively connected to the first member of the second planetary gear set; and the output member is operatively connected to the third member of the second planetary gear set.

8. The powertrain of claim 6, wherein engaging the torque-transmitting device grounds the engine to the stationary member to provide the first drive mode with the engine stopped, and disengaging the torque-transmitting device provides the second drive mode with the engine running.

9. The powertrain of claim 6, wherein the torque-transmitting device is one of a selectively engageable clutch and a selectively engageable brake capable of transmitting torque in two directions.

10. The powertrain of claim 6, wherein the respective operative connections of the power source and of the motor/generators with the first and the second planetary gear sets facilitate a controlled selection of speeds and torques of the engine and of the motor/generators for launching and propelling the vehicle.

11. A hybrid electric vehicle, comprising:
an engine;
a first motor/generator and a second motor/generator;
an electrically-variable transmission having:
an output member;
a stationary member;
a first planetary gear set and a second planetary gear set, wherein each of the respective first and second planetary gear sets have a first, a second, and a third member, and two members of the first planetary gear set are continuously connected to two members of the second planetary gear set; and
a torque-transmitting device;
wherein:
the engine and the second motor/generator are each continuously connected to the first planetary gear set, the first motor/generator and the output member are each continuously connected to the second planetary gear set, and the torque-transmitting device is engageable to ground the engine to the stationary member such that the transmission provides a first drive mode and a second drive mode for launching and propelling the vehicle.

12. The vehicle of claim 11, wherein:
the engine is operatively connected to the third member of the first planetary gear set;
the first motor/generator is operatively connected to the second member of the second planetary gear set;
the second motor/generator is operatively connected to the second member of the first planetary gear set;
the first member of the first planetary gear set is operatively connected to the third member of the second planetary gear set;
the third member of the first planetary gear set is operatively connected to the first member of the second planetary gear set; and
the output member is operatively connected to the third member of the second planetary gear set.

13. The vehicle of claim 11, wherein engaging the torque-transmitting device grounds the engine to the stationary member to provide the first drive mode with the engine stopped, and disengaging the torque-transmitting device provides the second drive mode with the engine running.

14. The vehicle of claim 11, wherein the torque-transmitting device is one of a selectively engageable clutch and a selectively engageable brake capable of transmitting torque in two directions.

15. The vehicle of claim 11, wherein the respective operative connections of the power source and of the motor/generators with the first and the second planetary gear sets facilitate a controlled selection of speeds and torques of the engine and of the motor/generators for launching and propelling the vehicle.

* * * * *